United States Patent

Przytulla

[11] 4,208,178
[45] Jun. 17, 1980

[54] HEAD FOR EXTRUDING THERMOPLASTIC TUBES

[75] Inventor: Dietmar Przytulla, Sindorf, Fed. Rep. of Germany

[73] Assignee: Mauser Kommandit-Gesellschaft, Bruhl, Fed. Rep. of Germany

[21] Appl. No.: 936,697

[22] Filed: Aug. 25, 1978

[30] Foreign Application Priority Data

Sep. 9, 1977 [DE] Fed. Rep. of Germany ...... 2740579

[51] Int. Cl.² ...................... B29D 23/04; B29F 3/04
[52] U.S. Cl. ........................ 425/467; 425/133.1; 425/462
[58] Field of Search .............. 425/461, 462, 466, 469, 425/133.5, 145, 381, 380, DIG. 1, 467, 133.1

[56] References Cited

U.S. PATENT DOCUMENTS

| | | | |
|---|---|---|---|
| 3,205,534 | 9/1965 | Langecker | 425/466 |
| 3,345,690 | 10/1967 | Hagen | 425/145 |
| 3,611,494 | 10/1971 | Feuerhern | 425/380 |
| 3,690,806 | 9/1972 | Kovacs | 425/380 |
| 3,909,183 | 9/1975 | Hsu | 425/466 |
| 4,120,633 | 10/1978 | Feuerhern | 425/462 |

Primary Examiner—James B. Lowe
Attorney, Agent, or Firm—Toren, McGeady and Stanger

[57] ABSTRACT

An extrusion head for producing tubes of thermoplastic material includes a housing laterally enclosing a mandrel and an extruding nozzle mounted on one end of the housing. The housing and mandrel combine to form an accumulator space into which the thermoplastic material is charged from a source. One of the housing and the mandrel includes an extrusion plunger which is displaceable away from the nozzle into the accumulator space for displacing the thermoplastic material toward the nozzle. As the plunger moves into the accumulator space it forms one side of a variable length annular passageway defining the outlet path of the thermoplastic material from the accumulator space.

11 Claims, 4 Drawing Figures

HEAD FOR EXTRUDING THERMOPLASTIC TUBES

SUMMARY OF THE INVENTION

The present invention is directed to a head for extruding thermoplastic tubes. The head contains an annular accumulator space defined by the outer wall of the mandrel and the inner wall of the extruding head housing. Further, the head includes an extrusion plunger displaceable through the accumulator space for forcing the thermoplastic material in the space through an outlet duct and an extruding nozzle.

To provide a more uniform dwell period for the thermoplastic material within the die head, as compared to other conventional heads including a duct arranged concentrically to the accumulator space and defined by a stationary portion of the head and connected to the accumulator space, an extrusion head was proposed where the length of the duct depends on the stroke of the extrusion plunger and, additionally, is defined by one of the generated surfaces of the plunger.

In such a head, the object was to charge the material into the accumulator space so that it collected below the lower end face of the plunger with the plunger moving in the downward direction during the working stroke toward the outlet nozzle. With this arrangement, the material which is the first to enter the accumulator space moves toward the nozzle and, thus, is the first material ejected through the nozzle during the extrusion process.

As a result, early in the passage of the thermoplastic material toward the nozzle, it is formed into an annular cross-section in the inlet duct connected to the accumulator space. This annular cross-section is maintained until the material is extruded from the nozzle. By providing the material with this annular cross-section during an early stage in its formation, flow lines and other irregularities in the tube wall are reduced.

Due to the fact, however, that the length of the duct changes during the plunger stroke, pressure changes develop in the extruder which result in temperature changes in the material and, thus, favor a varying stretching behavior of the tube as it is being produced.

Moreover, due to the plunger stroke, the effective inner surface of the plunger defining the duct, changes with the result that the shearing effect on the material entering the accumulator space is varied. Accordingly, the temperature changes resulting from the changes in pressure are increased. The pressure changes and the shearing action are considered the causes of the undesired influences on the material volume buildup in the accumulator space with these negative features being retained in the accumulator space. In addition, during the working and return strokes of the plunger, the material consistency is varied at each plunger position not only during charging but also during emptying of the accumulator space.

In known extrusion heads the supply ducts for the material are located between the mandrel and extrusion plunger. If interior feeding is used, the supply ducts are limited to the space within the inner surface of the plunger. This provides problems in attempting to limit the size of the head. The same problem exists where exterior feeding is employed, since the space for supplying the material is limited by the outer surface of the plunger. As a result, interior feeding requires the supply ducts within the mandrel, while in exterior feeding the supply ducts must be in the outer housing for the extrusion head.

Another problem exists when interior feeding is used in that the material is expanded in the radial direction as it flows into the accumulator space which has a larger diameter. Such an arrangement results in undesired thinned portions located at the periphery where the material flows together.

Where exterior feeding is utilized these disadvantages do not occur. Since exterior feeding requires longer distances for the flow of the material, larger supply duct cross-sections must be afforded which, in turn, require a larger structural volume of the extrusion head. This characteristic runs counter to the demand for smaller extrusion heads.

Therefore, the primary object of the present invention is to balance out pressure and temperature changes within the material, to prevent the damaging influence of shearing on the material before it enters the accumulator space, and to limit the structural size of the extrusion head.

In accordance with the present invention, thermoplastic material is supplied into the accumulator space through a stationary annular duct having a constant cross-section over its axial length and the supply duct can be emptied by the action of the extrusion plunger which moves downwardly toward the extrusion nozzle as the accumulator space is charged and effects displacement of the material by movement of the plunger away from the outlet nozzle. With this arrangement, the material passes from the accumulator space into the outlet duct through another annular duct having an axial length changing in accordance with the working stroke of the plunger.

With this arrangement the material first into the accumulator space is also the first to be extruded from that space so that it can be emptied, as compared to conventional extrusion heads, in a reverse direction, affording a stationary and unchangeable arrangement for the annular supply duct through which the material flows in an undisturbed manner into the accumulator space. Pressure and temperature changes as well as shearing effects are balanced out and a uniform filling of the accumulator space can be achieved. The material is subjected to a shearing effect only when it is ejected during the working stroke plunger and the shearing effect varies during the working stroke. This effect, however, is negligibly small, because the outlet duct is relatively long and provides a smoothing out effect.

It is especially advantageous that the portion of the mandrel remote from the nozzle can be freely utilized for the supply system for shaping the material initially provided as a solid strand. The inner surface of the plunger no longer limits the arrangement of this material supply system. This applies to extrusion heads using interior feeding. In extrusion heads employing exterior feeding, the outer surface of the plunger does not limit the arrangement of the supply system. Accordingly, in either type of feeding of the material, the structural size of the extrusion head can be effectively limited.

Another feature of the invention is that the annular duct connecting the accumulator space to the outlet duct during the working stroke of the plunger or piston is defined, in the case of interior feeding, by the outer surface of the mandrel and the inner surface of the plunger and, in the case of exterior feeding, by the outer surface of the plunger and the inner surface of the housing.

In accordance with the invention, the arrangement of the supply duct system, in the case of interior feeding, permits introduction of the material into the accumulator space in the region of its radially outer surface and, in the case of exterior feeding, in the region of the inner wall of the space. Therefore, the supply system ducts are located in the region of the extrusion head where the most space is available. The space in the opposite end of the head from the nozzle, which is not limited by any other structure, can be fully utilized.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
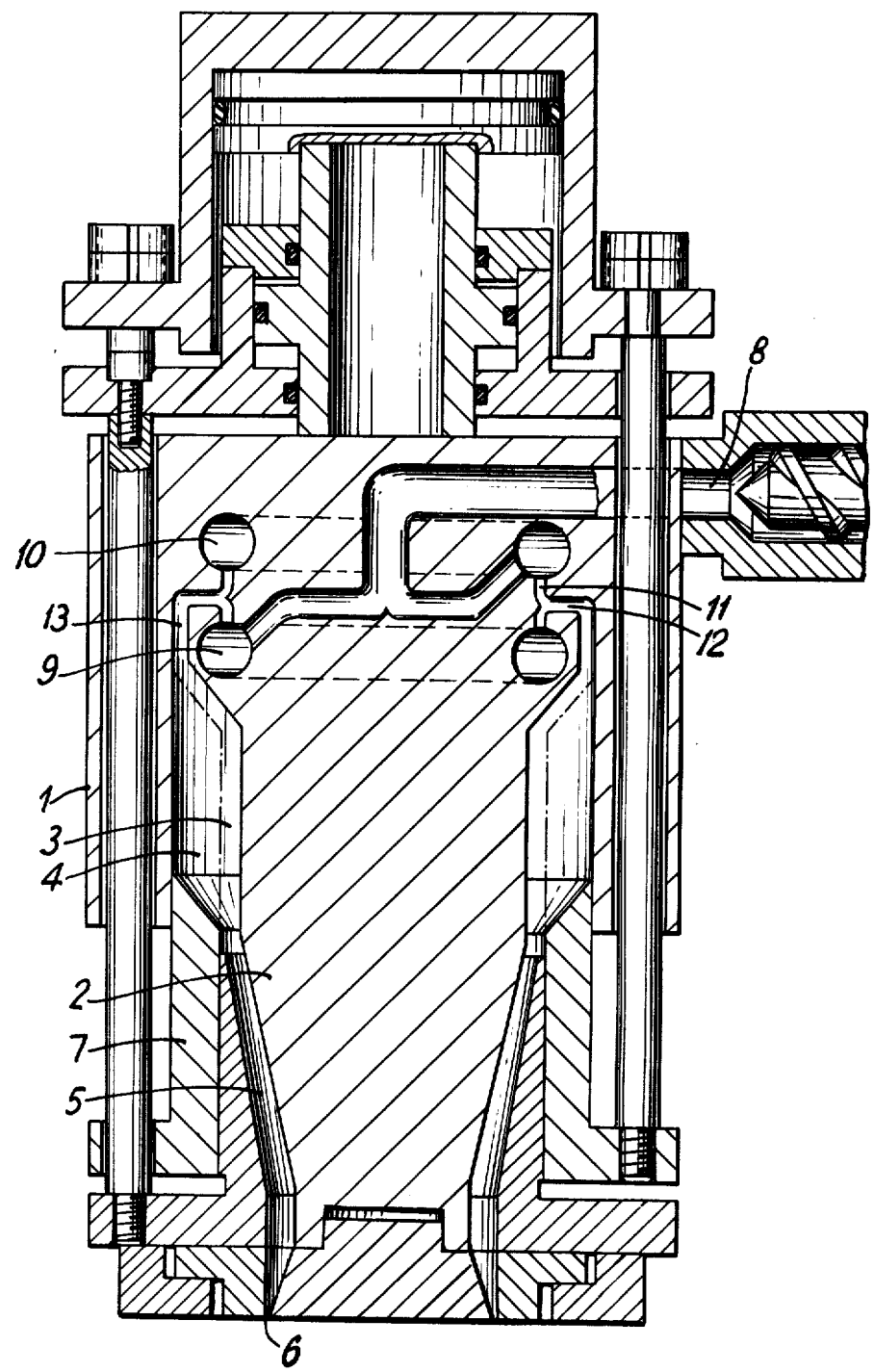
FIGS. 1 and 2 are longitudinal cross-sectional views of extrusion heads utilizing interior feeding with the housing for the head constructed in part as an extrusion plunger movable in the axial direction of the head.

In FIG. 1 the extrusion head is shown having a housing 1 laterally enclosing a mandrel 2. Inwardly of the housing is an annular accumulator space 4 connected via an outlet duct 5 to an annular nozzle 6 mounted on the lower end of the housing as viewed in FIG. 1. The lower portion of the housing 1 includes an extrusion plunger or piston 7 for displacing thermoplastic material from the space 4 when it is moved upwardly into the space. As shown in solid lines, the plunger 7 is in its lowered position when the space 4 has been charged with thermoplastic material, and the phantom lines show the position of the plunger moved upwardly for displacing the material from the space 4 through the outlet duct 5 to the nozzle 6.

Thermoplastic material is supplied through a duct 8 from a source, such as an extruder, and through a supply distribution system in the upper end of the mandrel into an inlet duct 13. The supply system includes a pair of annular ducts 9, 10 spaced apart in the axial direction of the head and each arranged to receive the material from a different bifurcated section of the supply duct 8. As can be noted, the annular ducts 9 and 10 are spaced considerably radially inwardly from the outer surface of the head. The annular ducts have the same cross-sectional shape and diameter and are arranged concentrically about the axis of the head. Further, the annular ducts 9, 10 are interconnected by another annular duct 11 extending in the axial direction of the extrusion head. This connecting duct consists of two equal length sections with a transverse annular duct 12 connected at one end to the duct 11 at a location equidistantly spaced from the ducts 9 and 10 and at the other end to the inlet duct 13. After flowing through the two annular ducts 9, 10 which are of equal length, the material enters the two sections of the interconnecting duct 11. The two partial flows moving through the duct 11 from the ducts 9 and 10 pass into the duct 12 and are welded together forming a tubular shaped member.

With the plunger 7 in the upper end position, as shown in phantom, the thermoplastic material reaches the accumulator space 4 through the annular inlet duct 13 entering the space adjacent its radially outer surface and pressing the plunger in the downward direction so that the material can fill the space 4. Subsequently, by moving the extrusion plunger 7 in the upward direction from its position shown in solid lines, the material within the accumulator space 4 is displaced through the annular duct 3 into the outlet duct 5 and through the annular nozzle 6 to the exterior of the extrusion head.

Annular duct 3 is formed between the radially inner surface of the plunger 7 and the radially outer surface of the mandrel as the plunger moves upwardly. Accordingly, the axial length of the duct 3 varies in accordance with the plunger position.

Figure 2:
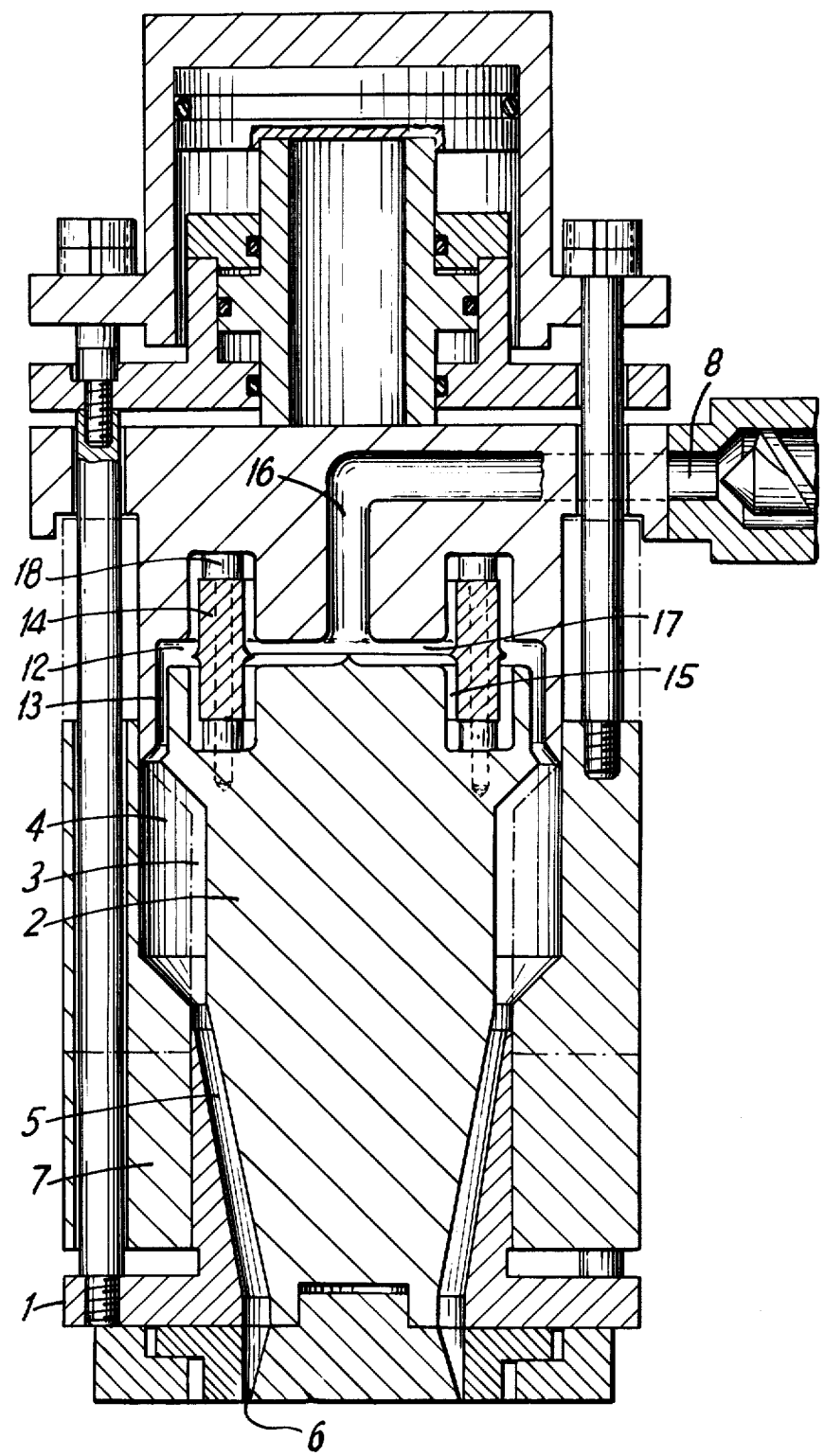

In FIG. 2 another embodiment of the extrusion head is shown utilizing interior feeding. In this embodiment the extrusion plunger 7 is also formed by the lower portion of the extrusion head housing. In this arrangement, however, the outer wall of the housing is connected to and extends upwardly from the plunger 7 so that it moves with the plunger as the plunger is displaced in the axial direction of the head. Accordingly, the shearing surface present in the embodiment of FIG. 1 between the radially outer surface of the plunger and the inner wall of the housing, is eliminated in FIG. 2.

Furthermore, in FIG. 2 the supply distribution system is different. Initially, the thermoplastic material flows from the source through duct 8 into an axially extending central duct 16 and then into a horizontal duct 17 directing the material outwardly in both directions from the central duct. From the duct 17 the material passes into an annular space or chamber 15. Space 15 extends upwardly and downwardly for the same distance from the duct 17 so that the axis of that duct divides the space in half. A ring-shaped member 14 is positioned within the tubular space 15 and is equi-spaced from its surfaces providing a pair of annular U-shaped passages through the space from the duct 17 into a radially outer duct 12.

The ring-shaped member 14 is mounted in the space 15 by means of screw bolts 18. The two partial flows through the space 15 are welded together into a tubular shaped member in the radially outer duct 12 as the material passed from that duct into the inlet duct 13.

Figure 3:
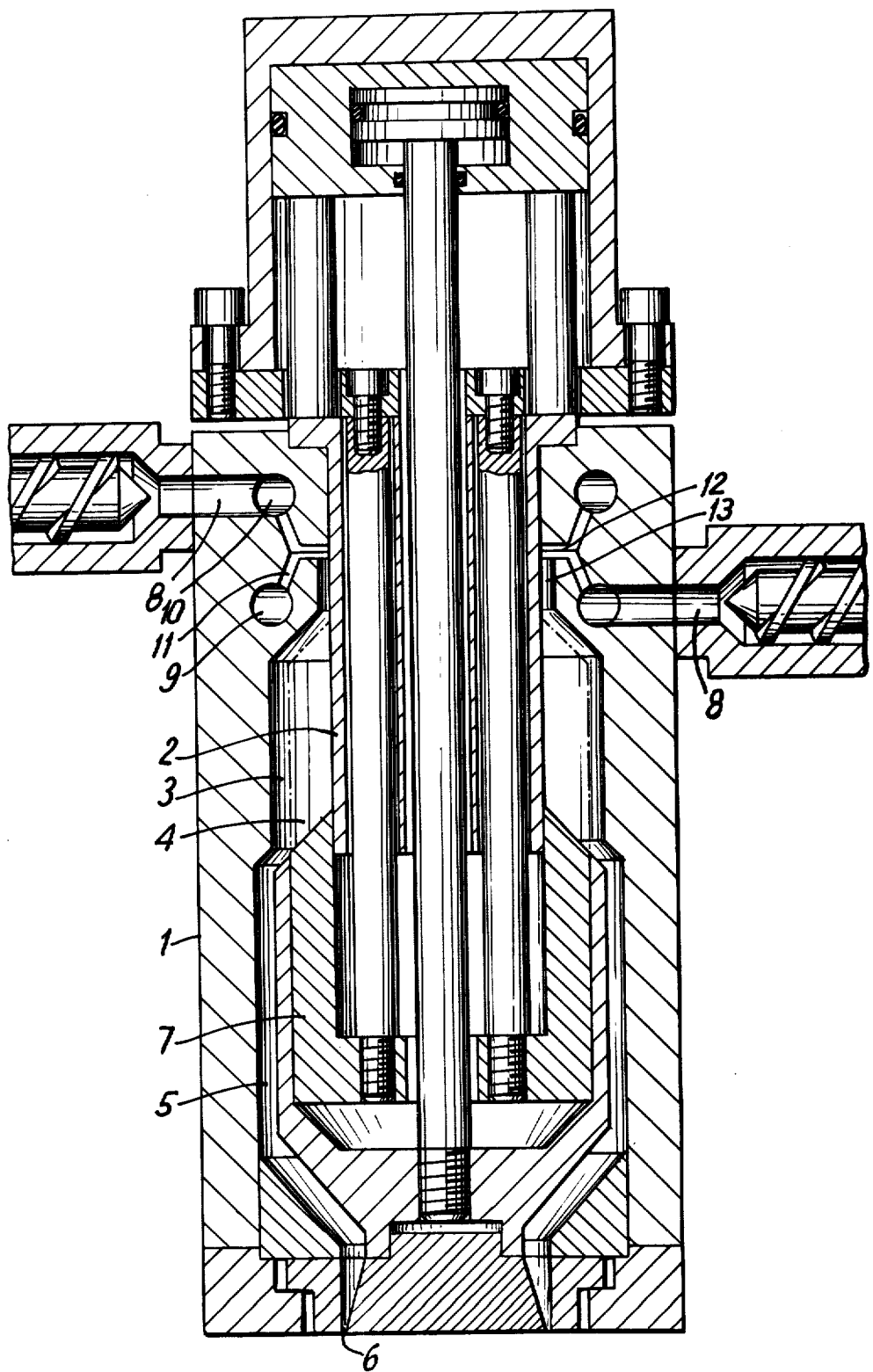
FIGS. 3 and 4 are longitudinal cross-sectional views of extrusion heads employing exterior feeding with portions of the mandrel forming the extrusion plunger which can be moved in the axial direction of the head.
Figure 4:
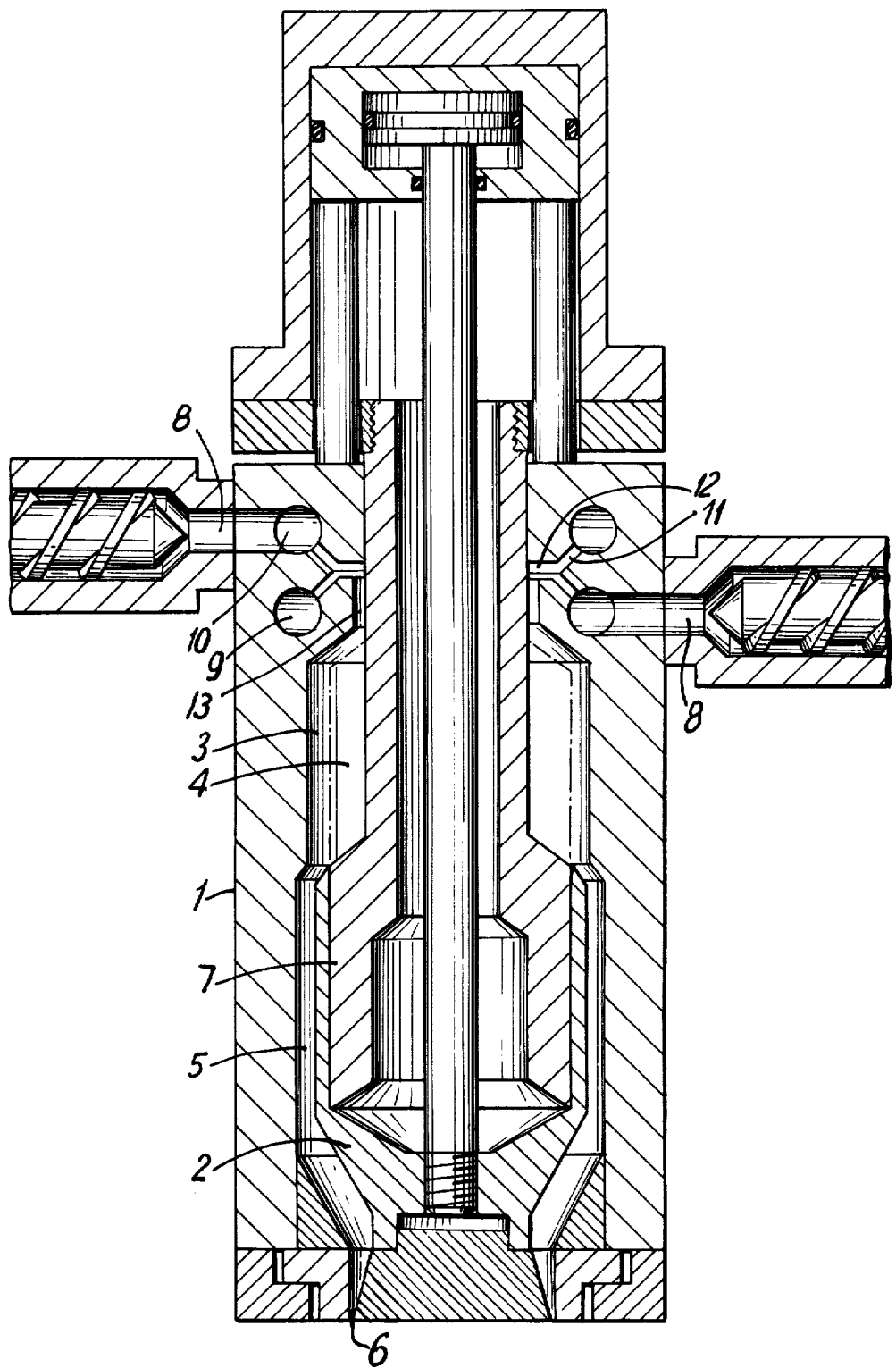

In the embodiments illustrated in FIGS. 3 and 4, the thermoplastic material is supplied to the extrusion heads by exterior feeding. The supply system including the ducts 9, 10, 11 and 12 are located in the wall of the housing 1 for the head. As distinguished from the arrangement shown in FIGS. 1 and 2, the inlet duct 13 opens into the accumulator space adjacent its inner surface. The annular ducts 9, 10 are supplied with material through two diametrical opposite ducts 8, each connected to an extruder.

In both of the embodiments of FIGS. 3 and 4, the annular duct 3, shown in phantom lines, is defined by the radially outer surface of the plunger 7 and the radially inner surface of the housing 1.

In FIG. 3, the mandrel 2 is constructed of three axially extending pieces. The middle piece of the mandrel is movable in the axial direction upwardly from the position shown in full lines to the position shown by the phantom lines.

In FIG. 4 the mandrel is made up of two parts, one fitted within the other, with the inner part movable in the axial direction from the position shown in full lines to the position shown by the phantom lines. As compared to the embodiment in FIG. 3, the embodiment of FIG. 4 resembles that in FIG. 2, since the shearing surface is eliminated.

While specific embodiments of the invention have been shown and described in detail to illustrate the application of the inventive principles, it will be understood that the invention may be embodied otherwise without departing from such principles.

What is claimed is:

1. An extrusion head for the production of tubes of thermoplastic material, comprising an axially extending housing and an axially extending mandrel having the axis thereof in generally parallel relation with the axis of said housing, axially extending portions of said housing and mandrel being in spaced relation and defining therebetween an annular axially extending accumulator space with the axis thereof disposed in parallel relation with the axis of said mandrel, said housing having a first end and a second end each extending transversely of the axis thereof, an extruding nozzle located at the second end of said housing, and axially extending portions of said housing and said mandrel forming an outlet duct arranged at one end thereof to receive thermoplastic material exiting from the end of said accumulator space closer to the second end of said housing and at the other end to deliver the thermoplastic material to said extruding nozzle, wherein the improvement comprises that said housing includes an annular shaped extrusion plunger movably displaceable through said accumulator space in the axial direction thereof, said plunger being movable from a position closer to the second end of said housing toward the first end of said housing with said plunger moving into said accumulator space for displacing the thermoplastic material therein through said outlet duct to said extruding nozzle, said accumulator space having a first end closer to the first end of said housing and a second end spaced in the axial direction thereof toward the second end of said housing, a supply duct system for conveying the thermoplastic material from a source into the first end of said accumulator space, said supply duct system including a stationary first annular duct extending in the axial direction of said housing and connected to the first end of said accumulator space around the circumferential extent thereof, said first annular duct having the same cross-section over the axial length thereof, as said extrusion plunger is moved into said accumulator space toward the first end of said housing and displaces the thermoplastic material from said accumulator space one of the axially extending surfaces of said extrusion plunger in combination with the juxtaposed surface of said mandrel forms a reduced annular duct-like portion of said accumulator space of variable axial length interconnecting the remaining portion of said accumulator space and said outlet duct.

2. An extrusion head, as set forth in claim 1, wherein said mandrel has a radially outer surface defining the radially inner surface of said accumulator space and said plunger having a radially inner surface and a radially outer surface with the radially inner surface of said plunger in combination with the radially outer surface of said mandrel defining the surfaces of said reduced annular duct-like portion of said accumulator space as said plunger moves toward the first end of said housing.

3. An extrusion head, as set forth in claim 2, wherein said first annular duct is connected to the first end of said accumulator space at the radially outer surface of said annular space and spaced radially outward from the radially inner surface of said accumulator space.

4. An extrusion head, as set forth in claim 2, wherein said plunger includes an annular wall extending axially from the end of said plunger closer to the first end of said housing and the radially inner surface of said annular wall defining the radially outer surface of said accumulator space prior to the displacement of said plunger into said accumulator space for displacing the thermoplastic material into said outlet duct.

5. An extrusion head, as set forth in claim 2, wherein said supply duct system located within said mandrel and comprising a bifurcated inlet duct for receiving the thermoplastic material from the source, a pair of second annular ducts spaced apart in the axial direction of said mandrel and each connected to a different bifurcated part of said inlet duct, and a third annular duct interconnecting said second ducts and said first duct.

6. An extrusion head, as set forth in claim 2, wherein said supply duct system located within said mandrel and comprising a bifurcated inlet duct for receiving the thermoplastic material from the source, said mandrel forming an annular chamber therein encircling the axis of said mandrel, said annular chamber arranged to receive thermoplastic material from said bifurcated inlet duct, a ring shaped member positioned within and spaced inwardly from the interior surfaces of said annular chamber forming two annular U-shaped passageways within said annular chamber, and an annular shaped intermediate duct connecting said annular chamber to said first annular duct.

7. An extrusion head for the production of tubes of thermoplastic material, comprising an axially extending housing and an axially extending mandrel having the axis thereof in generally parallel relation with the axis of said housing, axially extending portions of said housing and mandrel being in spaced relation and defining therebetween an annular axially extending accumulator space with the axis thereof disposed in parallel relation with the axis of said mandrel, said housing having a first end and a second end each extending transversely of the axis thereof, an extruding nozzle located at the second end of said housing, and axially extending portions of said housing and said mandrel forming an outlet duct arranged at one end thereof to receive thermoplastic material exiting from the end of said accumulator space closer to the second end of said housing and at the other end thereof to deliver the thermoplastic material to said extruding nozzle, wherein the improvement comprises that said mandrel includes an annular shaped extrusion plunger movably displaceable through said accumulator space in the axial direction thereof, said plunger being movable from a position closer to the second end of said housing toward the first end of said housing with said plunger moving into said accumulator space for displacing the thermoplastic material therein through said outlet duct, to said extruding nozzle, said accumulator space having a first end closer to the first end of said housing and a second end spaced in the axial direction thereof toward the second end of said housing, a supply duct system for conveying the thermoplastic material from a source into the first end of said accumulator space, said supply duct system including a stationary first annular duct extending in the axial direction of said housing and connecting to the first end of said accumulator space around the circumferential extent thereof, said first annular duct having the same cross-section over the axial length thereof, as said extrusion plunger is moved into said accumulator space toward the first end of said housing and displaces the thermoplastic material from said accumulator space one of the axially extending surfaces of said extrusion plunger in combination with the juxtaposed surface of said housing forms a reduced annular duct-like portion of said accumulator space of variable axial length interconnecting the remaining portion of said accumulator space and said outlet duct.

8. An extrusion head, as set forth in claim 7, wherein said housing having a radially inner surface and a radially outer surface, said plunger forming an axially extending part of said mandrel and having a radially inner surface and a radially outer surface with the radially inner surface of said housing and the radially outer surface of said plunger combining to form the surfaces of said second annular duct.

9. An extrusion head, as set forth in claim 8, wherein said first annular duct is connected to the first end of said accumulator space at the radially inner surface of said accumulator space and spaced radially inwardly from the radially inwardly from the radially outer surface of said accumulator space.

10. An extrusion head, as set forth in claim 8, wherein said plunger includes an annular wall extending axially from the end of said plunger closer to the first end of said housing, said annular wall forming an axially extending part of said mandrel and the radially outer surface of said annular wall defining the radially inner surface of said accumulator space prior to the displacement of said plunger into said accumulator space for displacing the thermoplastic material into said outlet duct.

11. An extrusion head, as set forth in claim 8, wherein said supply duct system is located within said housing and includes a pair of angularly spaced annular inlet ducts for receiving the thermoplastic material from the source, and an intermediate annular shaped duct unit connecting said inlet ducts and said first annular duct.

* * * * *